United States Patent [19]

Gebhardt et al.

[11] 4,303,708
[45] Dec. 1, 1981

[54] HEAT-SEALABLE PLASTIC FILM, PROCESS FOR ITS MANUFACTURE, AND THE USE OF THE FILM

[75] Inventors: Dieter Gebhardt, Wiesbaden; Günther Crass, Taunusstein; Siegfried Janocha, Wiesbaden, all of Fed. Rep. of Germany

[73] Assignee: Hoechst Aktiengesellschaft, Frankfurt am Main, Fed. Rep. of Germany

[21] Appl. No.: 25,682

[22] Filed: Mar. 30, 1979

[30] Foreign Application Priority Data

Apr. 3, 1978 [DE] Fed. Rep. of Germany ....... 2814311

[51] Int. Cl.³ .................. B65D 1/00; C09J 7/02; B32B 27/08
[52] U.S. Cl. ........................................ 428/35; 428/36; 428/332; 428/336; 428/347; 428/349; 428/402; 428/404; 428/515; 428/516
[58] Field of Search .......... 428/35, 36, 515, 516, 428/517, 519, 328, 331, 332, 336, 347, 402, 404, 349

[56] References Cited

U.S. PATENT DOCUMENTS

| | | | |
|---|---|---|---|
| 3,808,027 | 4/1974 | Anderson et al. | 428/332 |
| 4,010,307 | 3/1977 | Canard et al. | 428/330 |
| 4,086,383 | 4/1978 | Yamano et al. | 428/515 X |
| 4,101,050 | 7/1978 | Buckler et al. | 428/515 X |
| 4,123,576 | 10/1978 | Kobayashi et al. | 428/517 |
| 4,132,050 | 1/1979 | Young | 428/515 X |
| 4,147,827 | 4/1979 | Breidt | 428/517 |
| 4,148,972 | 4/1979 | Yamane et al. | 428/515 X |
| 4,256,784 | 3/1981 | Gebhardt et al. | 428/216X |

FOREIGN PATENT DOCUMENTS 2460597 10/1975 Fed. Rep. of Germany.
915589 1/1963 United Kingdom.

*Primary Examiner*—Thomas J. Herbert, Jr.
*Attorney, Agent, or Firm*—Schwartz, Jeffery, Schwaab, Mack, Blumenthal & Koch

[57] ABSTRACT

Disclosed is an opaque film of thermoplastic organic material which has been oriented by biaxial stretching, comprising a base layer of a polymer or copolymer of an α-olefin having 2 to 6 carbon atoms containing between about 1 and 25 percent by weight, calculated on the weight of the polymer, of finely distributed solid particles ranging in size from about 0.2 to 20 μm, and carried on at least one surface of the base layer, a heat-sealable layer comprising a copolymer of propylene with ethylene, a copolymer of propylene with butene, or a terpolymer of propylene with ethylene and a further α-olefin having from 4 to 10 carbon atoms. Also disclosed are a method of making this film and a package made therefrom.

20 Claims, 2 Drawing Figures

4,303,708

HEAT-SEALABLE PLASTIC FILM, PROCESS FOR ITS MANUFACTURE, AND THE USE OF THE FILM

BACKGROUND OF THE INVENTION

The present invention relates to an opaque film of thermoplastic organic material and more particularly to an opaque heat-sealable film of thermoplastic material containing a finely distributed solid filler material.

Films which are sufficiently impermeable to light, fat-repellent, and impermeable to water-vapor are required for many purposes, especially for packaging foodstuffs. The known opaque plastic films have these properties, but are incapable of being heat-sealed and have only mat, dull surfaces without the desired lustre. Furthermore, their printability is not particularly good.

A great number of processes and compounds have been disclosed which may be used for the preparation of a heat-sealable layer on a plastic film, but it must be expected that they will not improve the dull appearance of an opaque plastic film and that the plastic film will lose its white look.

SUMMARY OF THE INVENTION

Thus, it is an object of the present invention to provide an improved opaque thermoplastic film.

A further object of the invention resides in the provision of an opaque thermoplastic film with good heat-sealing properties.

Another object of the invention is to provide an opaque thermoplastic film with improved surface lustre.

It is also an object of the invention to provide an opaque thermoplastic film with improved printability.

Still another object is to provide a process for producing the improved films according to the invention.

It is also an object of the invention to provide an improved packaged article utilizing the films according to the invention.

In accomplishing the foregoing objects, there has been provided in accordance with the present invention an opaque film of thermoplastic organic material which has been oriented by biaxial stretching, comprising a base layer of a polymer or copolymer of an α-olefin having 2 to 6 carbon atoms containing between about 1 and 25 percent by weight, calculated on the weight of the polymer, of finely distributed solid particles ranging in size from about 0.2 to 20 μm, and carried on at least one surface of the base layer, a heat-sealable layer comprising a copolymer of propylene with ethylene, a copolymer of propylene with butene, or a terpolymer of propylene with ethylene and a further α-olefin having from 4 to 10 carbon atoms. Preferably, the base layer comprises a polymer or copolymer of an α-olefin having 2 to 4 carbon atoms, more preferably a propylene copolymer or homopolymer, especially a polypropylene homopolymer with an isotactic proportion of at least 90 percent.

Similarly, the heat-sealable layer(s) preferably comprise(s) a copolymer of propylene with from about 1 to 6 percent by weight of ethylene, wherein the comonomers are substantially statistically distributed. More preferably, the heat-sealable layer(s) comprise(s) a copolymer of propylene with from about 3 to 5 percent by weight of ethylene, wherein the comonomers are substantially statistically distributed, or a copolymer of propylene and butene-(1), wherein the comonomers are substantially statistically distributed and most preferably wherein the butene-(1) component amounts to from about 10 to 15 percent by weight of the propylene/butene-1 copolymer.

According to another aspect of the present invention, there has been provided a process for the manufacture of the above-described film, comprising the steps of co-extruding the melt of the polymer forming the base layer and the melt of the polymer forming the heat-sealable layer(s); cooling the resulting film for solidification; orienting the cooled film by stretching it in the longitudinal and the transverse directions, with the temperature applied during longitudinal stretching being between 5° and 20° C. lower than the temperature at which a clear film of the same material is normally stretched in the longitudinal direction; and heat-setting the oriented film. The melt temperatures in the co-extruding step are in the range from 250° to 300° C. Orienting by stretching is performed in the longitudinal direction at temperatures between 120° and 140° C., and in the transverse direction at temperatures between 155° and 175° C. The total stretching ratios for the longitudinal and the transverse stretching steps are in the range from 1:40 to 1:50. Heat-setting is performed at temperatures in the range from 150° to 160° C.

Also provided according to the invention is an article of manufacture, comprising a package having at least a portion thereof formed from a film as defined above.

Further objects, features and advantages of the invention will become apparent from the detailed description of preferred embodiments which follows, when considered together with the attached drawings.

DETAILED DESCRIPTION OF PREFERRED EMBODIMENTS

Figure 1:
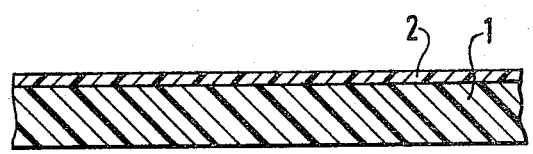
FIG. 1 is a cross-sectional view through a film according to the invention having a heat-sealable layer on one side.

The general category of products to which the present invention relates comprises opaque films of thermoplastic organic material which have been oriented by biaxial stretching and contain between about 1 and 25 percent by weight, preferably between about 5 and 15 percent by weight, calculated on the weight of the polymer, of finely distributed solid, preferably inorganic particles ranging in size from about 0.2 to 20 μm, and preferably from about 2 to 8 μm. The films according to the invention consist of a polymer or copolymer of an α-olefin having from 2 to 6 carbon atoms and they carry on at least one surface a heat-sealable layer comprised of a copolymer of propylene with ethylene, or a copolymer of propylene with butene, or a terpolymer of propylene with ethylene and a further α-olefin having from 4 to 10 carbon atoms.

The films according to the invention are mainly distinguished from known opaque films in that, surprisingly, in addition to high strength of the sealed seam and good mechanical properties, they possess a considerably improved pearlescent lustre. Whereas conventional opaque plastic films have a 45°-reflectometer value according to DIN 67530 of less than 50 percent, the films according to the invention advantageously have values between about 100 and 140 percent.

Due to its attractive appearance, the film according to the invention may be used with particular advantage for the manufacture of non-transparent packages, especially for light-sensitive foodstuffs. It may, however, also be used for other packaging purposes where non-transparent, heat-sealable plastic films of high gloss are required.

The materials for producing the heat-sealable copolymer layer or layers of the films according to the invention are disclosed, e.g., in German Offenlegungsschriften No. 1,694,694, No. 2,460,597, and No. 2,637,978, the last-mentioned corresponding to U.S. application Ser. No. 826,769 filed Aug. 22, 1978 now U.S. Pat. No. 4,256,784. The disclosures of each of these items are hereby expressly incorporated by reference herein.

The film according to the invention has the further advantage that it is excellently suitable for being printed by means of any of the conventional printing machines and that it can be processed in known processing apparatuses. Due to its good slip, the film has excellent processing properties. This is thought to be due to the fact that the heat-sealable layer comprises elevations which are caused by the particles contained in the film surface under the heat-sealable layer.

Heat-sealable layers may be applied to one or both surfaces of the film, and if two heat-sealable layers are applied, the two layers may differ in their thickness or their material, as may be required by the particular purpose for which the film is intended. It is an essential feature of the present invention that the surface of the film to which the glossy, pearlescent appearance is to be imparted carries the heat-sealable layer.

The process of the present invention is based on a known process for the manufacture of opaque films in sheet or tubular form, wherein a polymer melt is extruded. The polymer melt to be extruded is mixed with 1 to 25 percent by weight, preferably from 5 to 15 percent by weight, calculated on the weight of the polymer, of finely distributed solid particles ranging in size from 0.2 to 20 $\mu$m, preferably from 2 to 8 $\mu$m. The particles consist of the conventionally used, preferably inorganic materials, such as titanium dioxide, silicates, preferably zeolites, calcium compounds, e.g. in the form of carbonates or phosphates, or silica. In principle, it is also possible to use opaque organic particles, e.g., cross-linked plastic substances, such as highly cross-linked polyethylenes, provided their melting point is above the temperature applied during processing.

According to a preferred embodiment of the present invention, this polymer melt is co-extruded together with the melt of the polymer which forms the heat-sealable layer or layers. A conventional flat die is used for the manufacture of a flat sheet, and a conventional annular die is used for manufacturing a tubular film. The film is then cooled for solidification, e.g., passed over a cooling drum at a temperature between about 10° and 50° C., and the resulting pre-film, e.g., in web form, is then heated to the stretching temperature and stretched in the longitudinal direction between pairs of rollers rotating at different speeds. While being further transported, the film is cooled, and is then heated again before being transversely stretched as the next operation. Stretching in the transverse direction may be performed, e.g., in a tenter equipped with clips of known construction. The sequence of the two stretching steps is not critical; if desired, the film may be simultaneously stretched in both directions. The gloss of the film is not or only very slightly influenced by the stretching ratio. Finally, the film is heat-set in the known manner.

If a tubular film is produced, the film obtained by co-extrusion through an annular die is first cooled, e.g., by blowing with cool air, then heated again, and simultaneously stretched in the longitudinal and in the transverse directions, optionally it is stretched again in the longitudinal direction, and then is finally heat-set.

It is an essential feature of the present invention that the laminate obtained by co-extrusion is longitudinally stretched at a temperature which is between 5° and 20° C. lower than the temperature normally applied during the longitudinal stretching step in the manufacture of transparent films of the same material, while the temperatures used during the remaining process steps are adjusted in accordance with the present state of the art.

Expecially in the case of films comprised of a substantially isotactic polypropylene homopolymer, the temperature applied during longitudinal stretching is preferably about 5° to 10° C. lower, i.e., at about 120° to 130° C., whereas the temperature applied during transverse stretching is between about 160° and 170° C., and the temperature during heat-setting is around 150° to 160° C., meaning that these latter temperatures are at normal values.

The following Example serves to illustrate the invention, without however being limiting with respect thereto.

EXAMPLE

At a temperature of about 270° C., a 33 $\mu$m thick polypropylene film with 1 $\mu$m thick heat-sealable layers on both surfaces is co-extruded through a flat die. The polypropylene melt contains 8 percent by weight of finely distributed calcium carbonate particles of an average particle size of 2.4 $\mu$m. The two covering layers consist of a statistical copolymer of propylene with 4 percent by weight of ethylene. After it has been cooled to about 30° C. on a cooling drum, the film is stretched at a stretching ratio of 1:5.5 in the longitudinal direction at 125° C., and then at a stretching ratio of 1:9.0 in the transverse direction at 165° C. Finally, the film is heat-set at a temperature of 160° C.

The resulting film has a heat-sealing strength of 3.0 N/20 mm, which was determined as follows:

Two films are heat-sealed at 130° C. between the smooth, heated jaws of a heat-sealing apparatus of the type HSG-ET, manufactured by Messrs. Brugger, a pressure of 300 kPa being applied for 0.5 second. Then 20 mm wide test strips are cut from the heat-sealed films and the strength of the sealed seam is determined by separating the strips in a tearing apparatus of conventional construction at a separating speed of 100% per minute (T-peel).

The lustre of the film was measured according to the method of Dr. Schwarzau, Berlin, using a reflectometer of type RGN 10.01.02 and a planar polished black glass plate as the standard. The 45°-reflectometer value according to DIN 67530 is 120 percent.

The film has an opacity of 72 percent, measured according to DIN 53146, a friction of 30 percent, measured according to ASTM D 1894-63, and a density of 0.9 g/cm$^3$.

Figure 2:
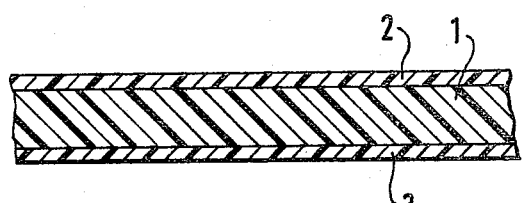
FIG. 2 is a cross-sectional view through a film according to the invention having a heat-sealable layer on both sides.

The attached FIGS. 1 and 2 show, in section, side views of the inventive film 1 with the heat-sealable layers 2 and 3.

What is claimed is:

1. Opaque film of thermoplastic organic material which has been oriented by biaxial stretching, comprising a base layer of a polymer or copolymer of an α-olefin having 2 to 6 carbon atoms containing an amount between about 1 and 25 percent by weight, calculated on the weight of the polymer, of finely distributed solid particles ranging in size from about 0.2 to 20 μm sufficient to render said film opaque, and carried on at least one surface of said base layer, a heat-sealable layer comprising a copolymer comprised predominatly of propylene, selected from a copolymer of propylene with ethylene, a copolymer of propylene with butene, or a terpolymer of propylene with ethylene and a further α-olefin having from 4 to 10 carbon atoms, whereby said film is opaque and has improved pearlescent lustre.

2. A film according to claim 1, wherein said film is in the form of a flat film.

3. A film according to claim 1, wherein said film is in the form of tubular film.

4. A film according to claim 1, having a 45°-reflectometer value according to DIN 67530 of from about 100 to 140 percent.

5. An article, comprising a package having at least a portion thereof formed from a film as defined by claim 1.

6. A film according to claim 1, wherein said film has a 45°-reflectometer value according to DIN 67530 of between about 100 and 140%.

7. A film according to claim 1, wherein the amount of said solid particles is between about 5 and 15% by weight.

8. A film according to claim 1, wherein said solid particles comprise a silicate, calcium carbonate, calcium phosphate, silica or opaque organic particles.

9. A film according to claim 1, wherein its thickness is in the range from about 8 to 100 μm.

10. A film according to claim 9, wherein the thickness of the heat-sealable layer is in the range from about 0.1 to 10 μm.

11. A film according to claim 10, wherein the thickness of the heat-sealable layer is in the range from about 0.5 and 2 μm.

12. A film according to claim 1, wherein said base layer comprises a polymer or copolymer of an α-olefin having 2 to 4 carbon atoms.

13. A film according to claim 1 or 12, wherein said heat-sealable layer(s) comprise(s) a copolymer of propylene with from about 1 to 6 percent by weight of ethylene, wherein the comonomers are substantially randomly distributed.

14. A film according to claim 13, wherein said heat-sealable layer(s) comprise(s) a copolymer of propylene with from about 3 to 5 percent by weight of ethylene, wherein the comonomers are substantially randomly distributed.

15. A film according to claim 1 or 12, wherein said heat-sealable layer(s) comprise(s) a copolymer of propyelene and butene-(1), wherein the comonomers are substantially randomly distributed.

16. A film according to claim 15, wherein the butene-(1) component preferably amounts to from about 10 to 15 percent by weight of the propylene/butene-1 copolymer.

17. A film according to claim 1 or 12, wherein the heat-sealable layer(s) comprise(s) a terpolymer comprising
from about 93.2 to 99.0 percent by weight of propylene,
from about 0.5 to 1.9 percent by weight of ethylene, and
from about 0.5 to 4.9 percent by weight of an α-olefin having 4 to 10 carbon atoms,
wherein the comonomers are substantially randomly distributed.

18. A film according to claim 17, wherein the heat-sealable layer(s) contain(s) butene-(1) or hexene-(1) as the α-olefin comonomer having 4 to 10 carbon atoms.

19. A film according to claim 12, wherein said base layer comprises a propylene copolymer or homopolymer.

20. A film according to claim 19, wherein said base layer comprises a polypropylene homopolymer with an isotactic proportion of at least 90 percent.

* * * * *